Patented Aug. 13, 1940

2,211,038

UNITED STATES PATENT OFFICE 2,211,038

PURIFICATION OF UNSATURATED COMPOUNDS

Alger L. Ward, Drexel Hill, Pa., assignor to The United Gas Improvement Company, a corporation of Pennsylvania No Drawing. Application October 22, 1937, Serial No. 170,508

6 Claims. (Cl. 260—666)

This invention pertains generally to the purification of compounds, and pertains particularly to the purification of hydrocarbons such as cyclopentadiene.

In many of the processes for the production of manufactured gas, for instance, coal gas, coke oven gas, oil gas and carburetted water gas, and generally in processes for the cracking of hydrocarbons, considerable quantities of unsaturated hydrocarbons of various boiling points are produced. Among these are various double bonded compounds such as olefins, diolefines, substituted olefins and diolefines, unsaturated cyclic compounds, etc.

For instance, when petroleum oil is used in the making of carburetted water gas, the product is found to contain among other things appreciable quantities of butadiene 1,3 (B. P. −4.5° C.), isoprene (B. P. 34° C.) cyclopentadiene (B. P. 40° C.), pentadiene 1,3 (B. P. 43° C.), styrene (B. P. 145° C.), and indene (B. P. 182° C.).

There are also present appreciable quantities of aromatic substances such as benzene (B. P. 79.6° C.), toluene (B. P. 110.5° C.), ortho, meta and para xylene (B. P. 144° C., 139° C., and 138° C. respectively), as well as naphthalene (B. P. 217.9° C.). Particularly in the case of coal gas or coke oven gas, considerable quantities of $CS_2$ may be present.

There are usually also present certain quantities of olefins and paraffins.

These materials are variously distributed in liquid products obtained in the production of manufactured gas such as tar, drip oil and medium and low temperature condensates resulting from subjecting the gas to refrigeration.

Rough separations of these materials may be made by distillation, but this tool is wholly incapable of substantially completely and quantitatively separating substances such as cyclopentadiene from materials of similar boiling point such as isoprene and pentadiene, 1,3 (piperylene), and a cut of cyclopentadiene obtained by distillation will usually contain some of these substances.

For instance, a typical cut was found to contain 36% isoprene, 18% piperylene, 23% pentenes, 5% pentanes, and 18% cyclopentadiene.

It is extremely difficult to separate cyclopentadiene from substances such as isoprene and piperylene (pentadiene 1,3) by chemical means in view of the presence in each of a conjugated double bond, which makes each of them highly reactive.

I have found that cyclopentadiene, as distinguished from isoprene and piperylene, is characterized by the ease with which it may be polymerized largely to dicyclopentadiene, and by the ease with which it may be regenerated by depolymerization of the dicyclopentadiene formed from it.

Dicyclopentadiene boils at about 130° above cyclopentadiene and consequently about 125–135° above a cut containing the bulk of the cyclopentadiene after reasonably good fractionation. If, therefore, cyclopentadiene can be polymerized under conditions that do not polymerize much of the accompanying hydrocarbons or other materials and if the polymers that are formed from the other materials are not depolymerized under the conditions required to depolymerize the dicyclopentadiene, it should be theoretically possible to separate the cyclopentadiene from the accompanying materials. Theoretically speaking, this might be accomplished by polymerizing the cyclopentadiene, say by heating, followed by a process such as distillation to remove the isoprene, piperylene and other low boiling hydrocarbons to obtain a fairly pure dicyclopentadiene which in turn might be depolymerized say by heating at or near its boiling point to form a relatively pure cyclopentadiene.

Although little is known about the polymerization of piperylene and although the dimerization of isoprene has been less studied than that of cyclopentadiene, I have tried, as a first step, heating the cyclopentadiene mixture at or near its boiling point.

Unfortunately, however, cyclopentadiene diluted with other hydrocarbons does not polymerize at a sufficiently high rate even at its boiling point to make such a process commercially feasible. In fact, the reaction is so slow as to take a most unreasonably long time for a sufficient quantity of the material to react. In dilute solution the reaction appears to be of the second order.

Incidentally, a solution of cyclopentadiene in other hydrocarbons is distinguished from relatively pure cyclopentadiene in this respect, since the latter may be polymerized readily and smoothly at its boiling point without the addition of a catalyst. The polymerization of pure cyclopentadiene appears to be a reaction of the first order.

The usual method of speeding up polymerization reactions, namely, the addition of catalysts, is not applicable in the present instance, first because the presence of the other reactive dienes prevents the process from being selective for cyclopentadiene and secondly because the presence of catalysts tends to result in the formation of molecules larger than the dimer and these higher molecular weight polymers do not depolymerize readily to give cyclopentadiene.

I have discovered that cyclopentadiene may be readily and rapidly polymerized in the presence of isoprene, piperylene and other hydrocarbons without at the same time polymerizing significant proportions of such other materials. This may be accomplished by subjecting the crude cyclopentadiene under superatmospheric pressure to an elevated temperature preferably considerably above the initial boiling point of the cyclopentadiene mixture. By "initial boiling point" is meant the initial boiling point of the monomeric mixture at atmospheric pressure and this term will be so used hereinafter.

Furthermore, I have found that the depolymerization of the dicyclopentadiene can be selective so that the small quantities of the other polymers formed incidental to the polymerization step are not depolymerized to low boiling monomers that would contaminate the cyclopentadiene formed by the depolymerization of the dicyclopentadiene.

In carrying out the first step of my invention, any means known in the art may be employed for raising the temperature of, and pressure on, the cyclopentadiene mixture for the purpose of selectively polymerizing the cyclopentadiene to dicyclopentadiene.

I find, for instance, that a closed vessel, such as an autoclave, is very suitable for this purpose. In this case the initial pressure is a function of, and is determined by, the temperature. As the polymerization progresses, the pressure for a given temperature decreases due to the formation of higher boiling polymers.

However, independently of how the pressure is applied, I find that the reaction

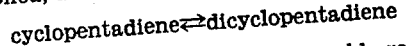

will proceed to the right with reasonable rapidity if a temperature considerably in excess of 40° C. is maintained, whereas to avoid too high a rate of reaction toward the left, the temperature usually should not exceed 170° C.

I find a temperature in the neighborhood of 100° C. to be convenient and satisfactory. The term "in the neighborhood of 100° C." is intended to include 100° C. and will be so employed in the claims.

It will be obvious that any other type of apparatus may be substituted whether adapted to carry out this polymerization step in batch, semicontinuously, continuously or otherwise.

I find it advantageous, however, particularly from the standpoint of avoiding the formation of dicyclopentadiene diperoxide or other oxygenated compounds to carry out the polymerization in a system at least substantially free from oxygen. This may be accomplished in most instances at least by purging the system with an inert gas, such as nitrogen.

I also find it advantageous to maintain at least the larger part of the reacting material in the liquid phase. This may be accomplished either by mechanical regulation of pressure, by limiting the vapor space above the liquid, or otherwise, as desired.

At the end of the polymerization step (during which cyclopentadiene is polymerized to dicyclopentadiene) the dicyclopentadiene may be separated from the lower boiling materials by any suitable means such as distillation at low pressure to purify the dicyclopentadiene.

I find the dicyclopentadiene of relatively high purity may be obtained by resorting to distillation at low pressure for this step. Substantial depolymerization of the dicyclopentadiene is thus avoided during the distillation, particularly if the pot temperatures are kept low and preferably are not permitted to rise above approximately 140° C.

Having separated the dicyclopentadiene from the other materials present, the final step comprises depolymerizing the dicyclopentadiene to cyclopentadiene. Since this material is more stable and easier to handle and transport in the dicyclopentadiene form, it may be desirable to delay the third step until the cyclopentadiene is required for use.

Depolymerization may be conveniently accomplished by heating the dicyclopentadiene at or near its boiling point in a still, preferably with provision for removing and condensing cyclopentadiene vapors as rapidly as they are formed. The conventional retort and condenser are suitable for this purpose and particularly when provision is made for condensing and refluxing any dicyclopentadiene vapors that may be formed.

Appropriate apparatus of wide variety will suggest itself to persons skilled in the art upon becoming familiar with this invention.

The following example will illustrate the invention. The data, however, must be interpreted in light of the fact that there are at present no exact methods of analysis for determining cyclopentadiene, dicyclopentadiene, piperylene or isoprene in the complex mixtures in which they frequently occur. Therefore, although the data were obtained by the best analytical methods known, they are nevertheless not represented as absolutely exact.

To show the completeness and selectivity of the polymerization, 350 milliliters (252 grams) of a cyclopentadiene fraction containing 31.5% cyclopentadiene and 47% other diene were heated in a closed autoclave for 24 hours at a temperature of approximately 92° C. The initial pressure developed was 55 pounds per square inch (gauge).

99.9% of the cyclopentadiene was polymerized of which 95.5% was dicyclopentadiene and the rest higher polymers.

Only 6.6% of the other dienes present were polymerized.

The above example clearly illustrates not only the high selectivity of the process for polymerizing cyclopentadiene in preference to other dienes, but also the high selectivity of the process for polymerizing cyclopentadiene to dicyclopentadiene in preference to higher polymers thereof.

I have found that total polydiene formation increases as the time or temperature of the polymerization increases and as the percentage of cyclopentadiene in the original charge decreases. On the other hand, after removal of the dicyclopentadiene formed as above, further heating appears to cause only slight further polymerization of the other dienes present. This indicates that the presence of cyclopentadiene or dicyclopentadiene influences the polymerization of the other dienes, notwithstanding the fact that under the conditions disclosed a substantial portion of the other dienes are not polymerized even in the presence of cyclopentadiene. However, the subject is complicated by many factors including the fact that cyclopentadiene and dicyclopentadiene will form polycyclopentadiene on heating without the application of pressure.

I find that heating for a period of 24 hours at a temperature in the neighborhood of 100° C. is very suitable.

The separation of dicyclopentadiene from the mixture is very conveniently and effectively accomplished by distillation at reduced pressure. I have repeatedly used pressures in the neighborhood of 25 millimeters of mercury with very good results. The purpose of low pressure distillation is, of course, to reduce the required still pot temperatures, thus avoiding depolymerization of dicyclopentadiene to cyclopentadiene during the distillation and separation of dicyclopentadiene.

I find that 95 to 97% pure dicyclopentadiene may be readily obtained by distillation. It is possible that higher purities might be obtained with more efficient apparatus.

Generally speaking, the above degree of purity of dicyclopentadiene is suitable for present industrial purposes.

Should a higher purity of dicyclopentadiene be desired, the dicyclopentadiene obtained as above may be, if desired depolymerized and the cyclopentadiene thus formed redimerized.

Any of the above steps or cycles may be repeated as often as desired and until the desired purity is obtained. It is found, however, that a single depolymerization produces a highly purified cyclopentadiene and a single repolymerization produces a highly purified dicyclopentadiene.

Another important application of the invention is its use for the removal of residual unpolymerized cyclopentadiene from the unpolymerized material remaining after the separation of dicyclopentadiene as set forth above.

Since this unpolymerized portion usually contains isoprene and piperylene which it is also desired to recover, the removal of all traces of the third component, cyclopentadiene, becomes important.

This may be accomplished by merely repeating the cycle of operations set forth above, namely, polymerizing the residual cyclopentadiene to dicyclopentadiene by heat and pressure, and then removing the dicyclopentadiene thus formed.

Other applications will suggest themselves to persons skilled in the art upon becoming familiar herewith.

It is to be understood that the above particular description is by way of illustration and that changes, omissions, additions, substitutions and/or modifications may be made within the scope of the claims without departing from the spirit of the invention, which is intended to be limited only as required by the prior art.

I claim:

1. In a process for selectively separating cyclopentadiene from a mixture containing a substantial quantity of other heat polymerizable diene material of similar boiling point, the step of subjecting said mixture in liquid phase to superatmospheric pressure and to elevated temperature between 40° C. and 170° C. to selectively dimerize cyclopentadiene to dicyclopentadiene, said superatmospheric pressure being sufficient to maintain said liquid phase.

2. In a process for selectively separating cyclopentadiene from a cyclopentadiene containing fraction obtained by distillation from condensate produced in the manufacture of artificial gas in which petroleum oil is cracked, said fraction containing isoprene and piperylene, the step of subjecting said fraction to superatmospheric pressure and to elevated temperature between 40° C. and 170° C. to selectively dimerize cyclopentadiene to dicyclopentadiene, said superatmospheric pressure being sufficient to maintain at least the larger part of said fraction in the liquid phase.

3. In a process for selectively separating cyclopentadiene from a mixture containing other unsaturated substances of similar boiling point including isoprene and piperylene, the step of subjecting said mixture in liquid phase to superatmospheric pressure and to temperature conditions in the neighborhood of 100° C. to selectively dimerize cyclopentadiene to dicyclopentadiene, said superatmospheric pressure being sufficient to maintain said liquid phase.

4. In a process for selectively separating cyclopentadiene from a mixture containing other heat polymerizable substance of similar boiling point such as isoprene and piperylene, the step of subjecting said mixture in liquid phase in the substantial absence of oxygen to superatmospheric pressure and to temperature conditions substantially above 40° C. but substantially below 170° C. to convert cyclopentadiene to dicyclopentadiene, said superatmospheric pressure being sufficient to maintain said liquid phase.

5. In a process for separating cyclopentadiene from isoprene and piperylene, the step of subjecting said cyclopentadiene isoprene and piperylene in the substantial absence of oxygen to superatmospheric pressure and to temperature conditions substantially above 40° C. but substantially below 170° C. for a time sufficient to selectively dimerize at least the preponderant part of said cyclopentadiene to dicyclopentadiene, said superatmospheric pressure being sufficient to maintain at least the larger part of said materials in the liquid phase.

6. In a process for selectively separating cyclopentadiene from a mixture containing other heat polymerizable diene material of similar boiling point wherein said cyclopentadiene is selectively converted to dicyclopentadiene, wherein said dicyclopentadiene is separated from unpolymerized material, and wherein said separated dicyclopentadiene is depolymerized to cyclopentadiene, the step of subjecting said mixture to superatmospheric pressure and to temperature conditions substantially above 40° C. but substantially below 170° C. to selectively convert cyclopentadiene to dicyclopentadiene, said superatmospheric pressure being sufficient to maintain at least the larger part of said mixture in the liquid phase.

ALGER L. WARD.